(12) United States Patent
Nilsson et al.

(10) Patent No.: US 12,434,710 B2
(45) Date of Patent: Oct. 7, 2025

(54) METHOD FOR OPERATING AN AUTONOMOUS VEHICLE

(71) Applicant: Volvo Truck Corporation, Gothenburg (SE)

(72) Inventors: Peter Nilsson, Hovås (SE); Oliver Sundell, Gothenburg (SE); Patrik Nilsson, Sunne (SE); Wilhelm Wiberg, Askim (SE); Stefan Bergquist, Gothenburg (SE); Oskar Wigström, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 217 days.

(21) Appl. No.: 17/609,810

(22) PCT Filed: May 17, 2019

(86) PCT No.: PCT/EP2019/062815
§ 371 (c)(1),
(2) Date: Nov. 9, 2021

(87) PCT Pub. No.: WO2020/233772
PCT Pub. Date: Nov. 26, 2020

(65) Prior Publication Data
US 2022/0227372 A1    Jul. 21, 2022

(51) Int. Cl.
*B60W 40/04* (2006.01)
*B60Q 1/34* (2006.01)
(Continued)

(52) U.S. Cl.
CPC .............. *B60W 40/04* (2013.01); *B60Q 1/346* (2013.01); *B60Q 5/005* (2013.01); *B60W 10/20* (2013.01);
(Continued)

(58) Field of Classification Search
CPC ...... B60W 40/04; B60W 10/20; B60W 10/30; B60W 30/18159; B60W 30/18163;
(Continued)

(56) References Cited

U.S. PATENT DOCUMENTS 10,317,902 B2    6/2019  Nilsson et al.
10,379,533 B2 *  8/2019  Bier ..................... G05D 1/0016
(Continued)

FOREIGN PATENT DOCUMENTS

CN    107180294 A    9/2017
CN    107438546 A    12/2017
(Continued)

OTHER PUBLICATIONS

First Office Action for U.S. Patent Application No. 201980096351.8, mailed Jul. 29, 2023, 19 pages.
(Continued)

*Primary Examiner* — Mohamed Abdo Algehaim
(74) *Attorney, Agent, or Firm* — Withrow & Terranova, PLLC (57) ABSTRACT

The present disclosure relates to a computer implemented method for operating an autonomous vehicle based on sensor data representative of an area in a driving direction of and in the vicinity of the vehicle. The vehicle is equipped with a control unit adapted to determine if a plurality of detailed actions to be performed by the vehicle successfully may be used for fulfilling a desired general action plan for the vehicle. The present disclosure also relates to a corresponding control system and to a computer program product.

18 Claims, 3 Drawing Sheets

(51) Int. Cl.
*B60Q 5/00* (2006.01)
*B60W 10/20* (2006.01)
*B60W 10/30* (2006.01)
*B60W 30/18* (2012.01)
*B60W 60/00* (2020.01)

(52) U.S. Cl.
CPC ...... *B60W 10/30* (2013.01); *B60W 30/18159* (2020.02); *B60W 30/18163* (2013.01); *B60W 60/001* (2020.02); *B60W 2420/403* (2013.01); *B60W 2420/408* (2024.01); *B60W 2520/00* (2013.01)

(58) Field of Classification Search
CPC ........... B60W 60/001; B60W 2420/42; B60W 2420/52; B60W 2520/00; B60W 2556/50; B60W 2720/10; B60W 2754/30; B60W 30/16; B60W 60/0011; B60W 40/02; B60W 2300/10; B60W 2300/12; B60W 2540/18; B60W 2554/802; B60W 2554/803; B60Q 5/006; B60Q 1/346; B60Q 5/005; B60Y 2200/14; B60K 2310/244; B60K 2310/264; G05D 2201/0202; G05D 2201/0213; G05D 1/0212; G06V 20/56; G08G 1/167
USPC ........................................................... 701/26
See application file for complete search history.

(56) References Cited

U.S. PATENT DOCUMENTS

| | | | | |
|---|---|---|---|---|
| 11,391,579 | B2* | 7/2022 | Forsberg | G01C 21/34 |
| 2003/0221898 | A1 | 12/2003 | Yasui et al. | |
| 2014/0379247 | A1 | 12/2014 | Ferguson et al. | |
| 2015/0266471 | A1* | 9/2015 | Ferguson | G05D 1/024 |
| | | | | 701/1 |
| 2016/0325721 | A1 | 11/2016 | Jonasson et al. | |
| 2017/0192437 | A1* | 7/2017 | Bier | G05D 1/0077 |
| 2018/0150081 | A1* | 5/2018 | Gross | G01C 21/3446 |
| 2018/0162390 | A1* | 6/2018 | Miura | B62D 6/00 |
| 2018/0173240 | A1 | 6/2018 | Fang et al. | |
| 2018/0261093 | A1* | 9/2018 | Xu | G05D 1/0278 |
| 2018/0341276 | A1 | 11/2018 | Kislovskiy et al. | |
| 2019/0009784 | A1 | 1/2019 | Takeda | |
| 2019/0015976 | A1* | 1/2019 | Sweeney | G01C 21/3676 |
| 2019/0135290 | A1* | 5/2019 | Marden | G06V 20/588 |
| 2020/0033869 | A1* | 1/2020 | Palanisamy | G06N 5/043 |
| 2020/0074851 | A1* | 3/2020 | Mukai | B60W 50/0205 |
| 2020/0283028 | A1* | 9/2020 | Oba | B60W 60/0057 |
| 2020/0298877 | A1* | 9/2020 | Takamatsu | G01C 21/3415 |
| 2021/0019534 | A1* | 1/2021 | Sakamoto | G01S 17/86 |
| 2021/0213972 | A1* | 7/2021 | Forsberg | G08G 1/165 |
| 2021/0276572 | A1* | 9/2021 | Du | B60W 40/04 |
| 2022/0204056 | A1* | 6/2022 | Russell | B60W 60/00272 |

FOREIGN PATENT DOCUMENTS

| | | |
|---|---|---|
| JP | 2009184497 A | 8/2009 |
| JP | 2016149110 A | 8/2016 |
| JP | 2017094805 A | 6/2017 |
| WO | 2018063250 A1 | 4/2018 |
| WO | 18162521 A1 | 9/2018 |
| WO | 2019072379 A1 | 4/2019 |

OTHER PUBLICATIONS

International Search Report and Written Opinion for International Patent Application No. PCT/EP2019/062815, mailed Jan. 23, 2020, 14 pages.

Office Action for Japanese Patent Application No. 2021568318, mailed Feb. 24, 2023, 5 pages.

Office Action for Korean Patent Application No. 1020217037573, mailed Mar. 20, 2024, 10 pages.

* cited by examiner

METHOD FOR OPERATING AN AUTONOMOUS VEHICLE

This application is a 35 USC 371 national phase filing of International Application No. PCT/EP2019/062815, filed May 17, 2019, the disclosure of which is incorporated herein by reference in its entirety.

TECHNICAL FIELD

The present disclosure relates to a computer implemented method for operating an autonomous vehicle based on sensor data representative of an area in a driving direction of and in the vicinity of the vehicle. The vehicle is equipped with a control unit adapted to determine if a plurality of detailed actions to be performed by the vehicle successfully may be used for fulfilling a desired general action plan for the vehicle. The present disclosure also relates to a corresponding control system and to a computer program product.

BACKGROUND

Recently there have been great advances in the semi and fully autonomous operation of a vehicle, effectively providing driver assistance and safety functions, such as adaptive cruise control, pedestrian detection, front and rear collision warning, lane departure warning and general obstacle detection. Such an autonomous vehicle typically makes use of a plurality of sensors that are configured to detect information about an environment surrounding the vehicle. The sensor may for example implement camera vision and radar or LiDAR technologies, possibly fusing the outputs form the sensor for forming an understanding of the vehicle environment.

An example of such a vehicle is presented in US20140379247, where the vehicle and its associated control system use information provided from the sensors to navigate through the environment. For example, if the sensor(s) detect that the vehicle is approaching an obstacle, the control system adjusts the directional controls of the vehicle to cause the vehicle to navigate around the obstacle.

Specifically, the control system according to US20140379247 makes use of a navigation/pathing system as well as an obstacle avoidance system for safe navigation of the vehicle within the detected environment surrounding the vehicle, by controlling the speed and direction of the vehicle. Typically, both the navigation/pathing system and the obstacle avoidance system apply a generalized object and feature detection process for navigation and obstacle avoidance, making the operation of the vehicle overall reliable. However, due to the generalized object and feature detection process approach presented by US20140379247, the implementation will typically be computational inefficient and thus slow. Accordingly, it would be desirable to provide further enhancements for improving the operation of such an autonomous vehicle, specifically targeted towards computational efficiency suitable for an in-vehicle implementation, possibly also allowing for improved robustness of the vehicle operation.

SUMMARY

According to an aspect of the present disclosure, the above is at least partly alleviated by a computer implemented method for operating an autonomous vehicle, the vehicle comprising at least one sensor arranged to capture information in an area in a driving direction of and in the vicinity of the vehicle, and a control unit arranged in communication with the at least one sensor, the control unit implementing a general action module and a plurality of detailed action modules, wherein the method comprises the steps of receiving, at the control unit, sensor data from the at least one sensor, determining, using the general action module and based on the sensor data, a desired general action plan to be performed by the vehicle when the vehicle is driving on a road, selecting, using the control unit, at least one detailed action module matching at least a portion of the determined general action plan, determining, using the selected at least one detailed action module and based on the sensor data, a plurality of detailed actions to be performed for fulfilling the desired general action plan, and estimating, using the control unit and based on the plurality of detailed actions, a success rate for fulfilling the desired general action plan.

The overall idea with the present disclosure is to implement a "macro-micro scheme" for operating a vehicle, specifically in relation to an autonomous truck. The macro part of the scheme makes "overall decisions" over an in comparison longer horizon, such as a lane change or similar, defined above as a desired general action plan, representing the discrete motion planning and includes a high-level characterization of the vehicle motion.

Consequently, the micro part of the scheme is a specifically targeted "algorithm" that takes part in the planning of how the actual action of changing lane should take place and over an in comparison shorter horizon, defined above as the detailed actions. In some embodiments the scheme includes one macro part and one or many micro parts, where different micro parts are targeted towards different types of detailed actions, representing the continuous motion planning and includes a low-level characterization of the vehicle motion.

In line with the present disclosure it is further made an estimation of if the determined detailed actions in the end may be considered to fulfill the desired general action plan. Consequently, the present disclosure estimates a success rate based on the determined plurality of detailed actions. The success rate may subsequently be used when deciding if to execute of the determined plurality of detailed actions for operating the vehicle.

Within the context of present disclosure, it should be understood that the expression "detailed action" should be interpreted broadly, meaning that actual determinations as well as estimations or simulations of parameters for operating the vehicle are to be included. Accordingly, the estimation of the success rate must not necessarily be performed based on detailed actions being final control parameters for operating the vehicle but may rather be performed based on estimation or simulation of such control parameters.

Furthermore, within the context of present disclosure, it should be understood that the expression "success rate" should be interpreted as a measurement of how well the determined plurality of detailed actions in collaboration may fulfill the general action plan. Accordingly, in some embodiments the success rate may be seen as a form or a quality metric for the general plan e.g. executed using the plurality of detailed actions. In some embodiments the success rate may be arranged to fall within a predefined range, such as e.g. 0-100.

Advantages following the use of the presently disclosed macro-micro scheme is that each of the micro parts (i.e. the detailed action modules) may be individually trained towards a specific type of condition for operating the vehicle. Such an approach will allow the specific implementation of each detailed action modules to be optimized, typically improving computational efficiency since each detailed action modules may be used for focusing on a single type operation rather than the generalization needed for a multi-purpose operational implementation. By using a targeted implementation, it may also be possible to reduce the needed execution time for determining the plurality of detailed actions as well as improving handling of "complicated" scenarios, such as possibly not readily identifiable when using an in comparison, more generalized operational implementation.

It is worth noticing that the expression "autonomous vehicle", as used above, should be interpreted broadly and relates to a vehicle that is operated in a fully or partially autonomous mode. In a partially autonomous vehicle some functions can optionally be manually controlled (e.g. by a driver) some or all of the time. Further, a partially autonomous vehicle may be configured to switch between a fully-manual operation mode and a partially-autonomous and/or a fully-autonomous operation mode.

The control unit may in one embodiment be an electronic control unit (ECU), typically provided as an onboard component of the vehicle. Correspondingly, the sensors may for example include sensors for determining what is happening in a surrounding of the vehicle, for example including at least one of a radar, a LiDAR sensor and/or a camera. Other sensors for measuring speed, acceleration, inclination, torque, vehicle mass, etc. may be equally used in determining the desired general action plan to be performed by the vehicle.

The presented operational scheme may for example be used in relation to operation of the autonomous vehicle to drive, e.g. along a previously estimated travel path, from point A to point B along a road (sometimes denoted as a "Hub-to-Hub" mission) and to maneuver the autonomous vehicle in traffic (e.g. stay in/change lane, increase/decrease speed) and how to derive a drivable trajectory for the according maneuvers. The present scheme receives information on which route to follow and input information describing the road and actors on the road. Based on this information, the present scheme may form a trajectory that the autonomous vehicle may follow to stay on the intended route and adapt the speed to surrounding vehicles (e.g. being a combination of autonomous and manual vehicles).

It should furthermore be understood that the overall motion planning, i.e. the determination of the general action plan, is typically being continuous updated. That is, the operational environment for the vehicle (e.g. the world around the vehicle and all different states of the vehicle(s)) vary continuously and it is also uncertain. However, the prior-art motion planning will: (i) take into account detailed dynamics but only search a very limited local portion of the overall solution space; (ii) cover larger portions of the search space but with less detail and higher computational burden.

Conversely, in relation to the present disclosure the planning problem is "decomposed". That is, at a macro level, the continuous search space is divided (discretization) into smaller more manageable regions (lane change/no lane change), small enough for a micro level specialized algorithm to efficiently cover. The discretization could span multiple decisions into the future, i.e. create gap, perform lane change. However, due to uncertainty, if e.g. a general plan of creating gap is chosen, there is a chance that the maneuver fails (one could regard this as a macro action "abort maneuver" if the success rate is considered "too low").

Thus, if a general action plan is determined, e.g. lane change, it is not certain that actual action of changing lane in the end is executed, since there is a possibility that it will be necessary to stay in the same lane. Therefore, in some sense the general action plan approximately accounts for the possible upcoming general action plans depending which are taken as a result of that general action plan. To deal with this uncertainty, it is line with the present disclosure a desire to estimate an expected value of the currently available actions and the accompanying branches of resulting possible actions.

Accordingly, in line with the present disclosure an estimation of the success of a detailed action module performed, possibly taking into account an approximation of its performance on a range of possible future scenarios, e.g. based on a predefined uncertainty model. This could be performed by running the actual detailed module many times for different random outcomes using the uncertainty model. Alternately, an approximation of the detailed model could be run in the same fashion.

In line with the present disclosure, the desired general action plan may for example include one or a combination of general action plans. For example, one or a combination of general action plans may be used for traffic planning of a maneuver for the vehicle. As in relation to the lane change as discussed above, such a lane change may include more than a single general action plan for accomplishing the lane change, such as creating gap for the lane change in combination with traversing from one lane to the other.

Accordingly, the one or combination of general action plans may for example be selected from a group comprising a lane change, creating gap for a lane change, forcing a gap for a lane change, facilitating surrounding traffic for a lane change, navigating an intersection, navigating a roundabout, navigating a road construction area, stopping at a side of a road, decreasing a time gap, increasing a time gap, initiating a longitudinal velocity change, initiating a lateral velocity change, and initiating an abort maneuver. Further example may of course exist and are within the scope of the present disclosure.

In a similar manner, the detailed actions may in one embodiment be selected from a group comprising an acceleration request, a deceleration request, a steering angle request, an operation of turn indicator lights, and an operation of a vehicle horn. Similarly, further example may of course exist and are within the scope of the present disclosure.

In a possible embodiment of the present disclosure, the desired general action plan is indicative of an action to be taken within e.g. the next 20 seconds (or alternatively 200-500 meters ahead of the vehicle). However, it may also be possible to allow the time/length of the desired general action plan to be set dependent on a current speed of the vehicle. For example, it may be desirable to set the desired general action plan to match the speed of the vehicle in such a manner that the vehicle may come to a full stop during operation within a single desired general action plan.

In a corresponding manner, the plurality of detailed actions are indicative of actions to be taken within less than e.g. 10 seconds (or alternatively 0-200 meters ahead of the vehicle). Similarly, it may also be possible to allow the time/length of the plurality of detailed actions are indicative of actions to be taken within less than 10 seconds to be set dependent on a current speed of the vehicle.

In a preferred embodiment of the present disclosure the method further comprises the step of operating the vehicle according to the plurality of detailed actions only if the estimated success rate is above a threshold level. Accordingly, if it is estimated that execution of the detailed actions will not surely fulfill the desired general action plan, then this may for example result in that another, possibly slightly adapted, general action plan is determined to be subsequently used in determining further detailed actions.

Furthermore, in one embodiment of the present disclosure the threshold level may be dependent on a current speed of the vehicle. As such, in case the vehicle is travelling at an in comparison high speed it may be desirable to increase the threshold as compared to a situation where the vehicle is travelling at an in comparison lower speed. Such an implementation will possibly increase the safety in operating the vehicle.

According to another aspect of the present disclosure there is provided a control system arranged adapted for controlling an autonomous vehicle, the vehicle comprising at least one sensor arranged to capture information in an area in a driving direction of and in the vicinity of the vehicle, and a control unit arranged in communication with the at least one sensor, the control unit implementing a general action module and a plurality of detailed action modules, wherein the control unit is adapted to receive sensor data from the at least one sensor, determine, using the general action module and based on the sensor data, a desired general action plan to be performed by the vehicle when the vehicle is driving on a road, select at least one detailed action module matching at least a portion of the determined general action plan, determine using the selected at least one detailed action module and based on the sensor data, a plurality of detailed actions to be performed for fulfilling the desired general action plan, and estimate, based on the plurality of detailed actions, a success rate for fulfilling the desired general action plan. This aspect of the present disclosure provides similar advantages as discussed above in relation to the previous aspect of the present disclosure.

In a preferred embodiment of the present disclosure, the on-board control system is provided as a component of the vehicle, typically further comprising the above-mentioned sensors. The vehicle may in turn be e.g. one of a bus, a truck, a car, or any form of construction equipment or working machine. Since the vehicle may be one of e.g. a construction equipment or a working machine, the expression road as used above should be interpreted broadly, including any dedicated areas where the vehicle is operating. The vehicle may furthermore be at least one of a pure electrical vehicle (PEV) and a hybrid electric vehicle (HEV).

According to a further aspect of the present disclosure there is provided a computer program product comprising a non-transitory computer readable medium having stored thereon computer program means for operating a control system adapted to control an autonomous vehicle, the vehicle comprising at least one sensor arranged to capture information in an area in a driving direction of and in the vicinity of the vehicle, and a control unit arranged in communication with the at least one sensor, the control unit implementing a general action module and a plurality of detailed action modules, wherein the computer program product comprises code for receiving, at the control unit, sensor data from the at least one sensor, code for determining, using the general action module and based on the sensor data, a desired general action plan to be performed by the vehicle when the vehicle is driving on a road, code for selecting, using the control unit, at least one detailed action module matching at least a portion of the determined general action plan, code for determining, using the selected at least one detailed action module and based on the sensor data, a plurality of detailed actions to be performed for fulfilling the desired general action plan, and code for estimating, using the control unit and based on the plurality of detailed actions, a success rate for fulfilling the desired general action plan. Also this aspect of the present disclosure provides similar advantages as discussed above in relation to the previous aspects of the present disclosure.

The computer readable medium may be any type of memory device, including one of a removable nonvolatile random access memory, a hard disk drive, a floppy disk, a CD-ROM, a DVD-ROM, a USB memory, an SD memory card, or a similar computer readable medium known in the art.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings:

FIGS. 1A illustrates a truck, 1B a bus and 1C a wheel loader in which the control system according to the present disclosure may be incorporated;

DETAILED DESCRIPTION OF EXAMPLE EMBODIMENTS OF THE INVENTION

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Figure 1A:
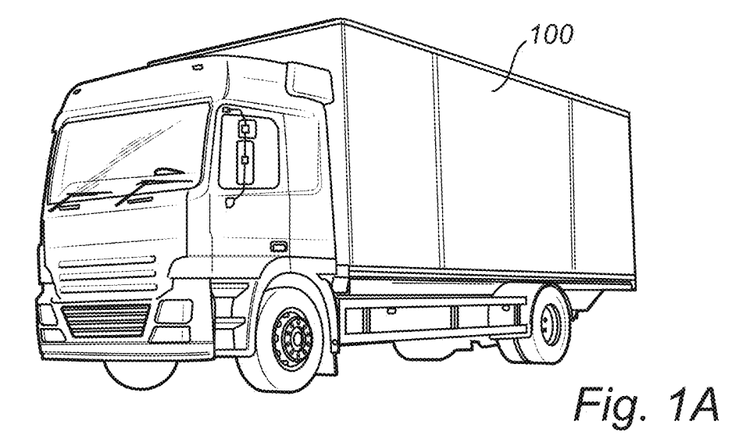
Figure 1B:
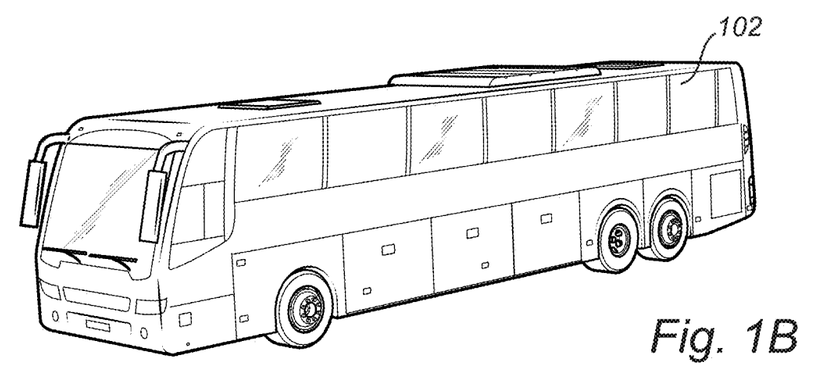
Figure 1C:
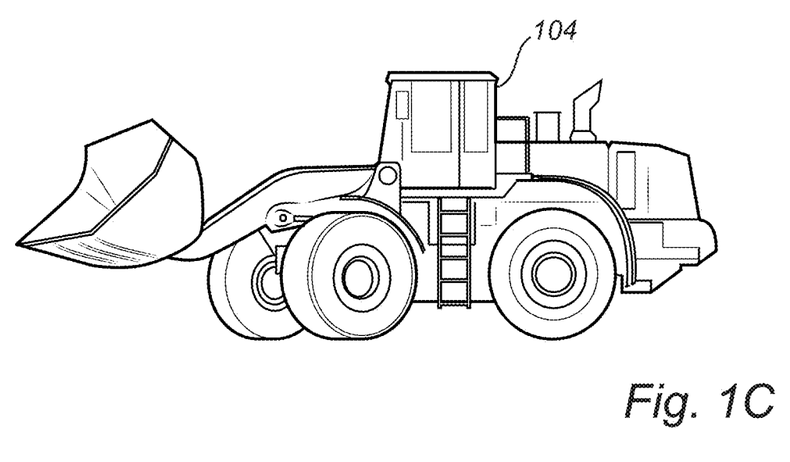
Figure 2:
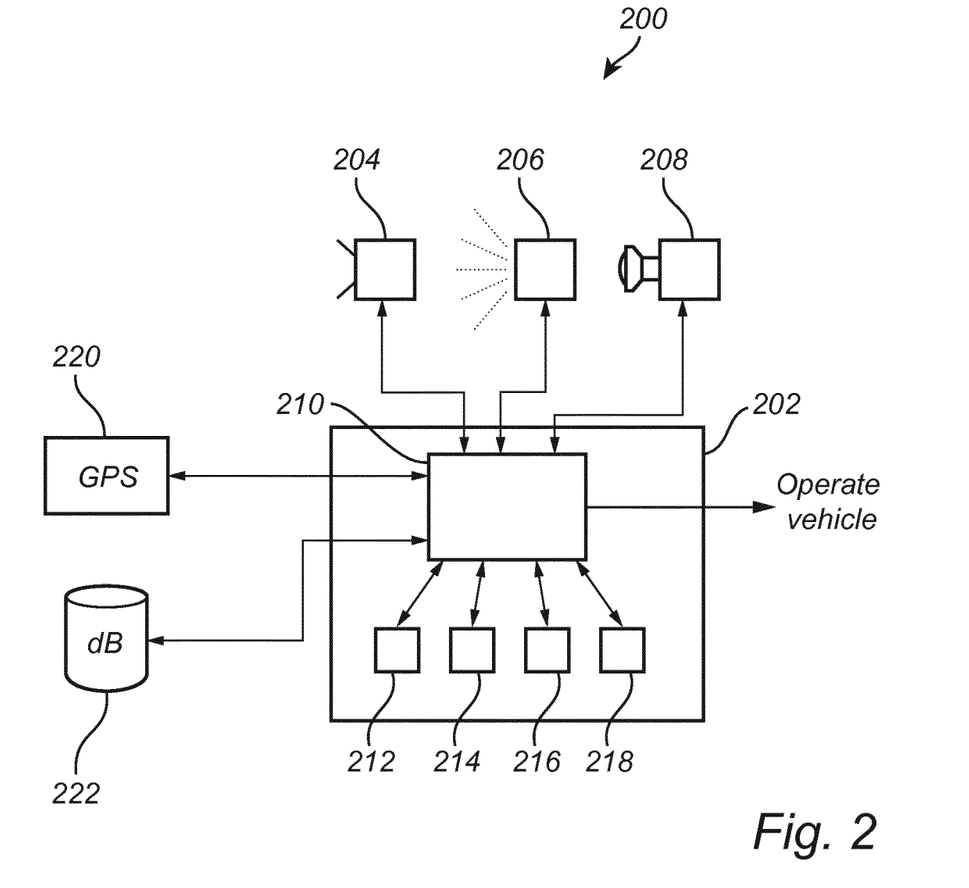
FIG. 2 illustrates a conceptual control system in accordance to a currently preferred embodiment of the present disclosure.

Referring now to the drawings and to FIG. 1A in particular, there is depicted an exemplary vehicle, here illustrated as a truck 100, in which a control system 200 (as shown in FIG. 2) according to the present disclosure may be incorporated. The control system 200 may of course be implemented, possibly in a slightly different way, in a bus 102 as shown in FIG. 1B, wheel loader as shown in FIG. 1C, a car, a bus, etc.

The vehicle may for example be one of an electric or hybrid vehicle, or possibly a gas, gasoline or diesel vehicle. The vehicle comprises an electric machine (in case of being an electric or hybrid vehicle) or an engine (such as an internal combustion engine in case of being a gas, gasoline or diesel vehicle). The vehicle may further be manually operated, fully or semi-autonomous.

FIG. 2 shows a conceptual and exemplary implementation of the control system 200, comprising a control unit 202, such as an electronic control unit (ECU), adapted for operating e.g. any one of the vehicles 100, 102, 104. The ECU 202 implements an interface for receiving data from a plurality of sensors 204, 206, 208, such as e.g. a radar 204, a LiDAR sensor arrangement 206 and a camera 208. The control system 200 may also be provided with an interface for operating the vehicle based on the above discussed general action plan(s) and plurality of determined detailed actions.

For reference, the ECU 202 may for example be manifested as a general-purpose processor, an application specific processor, a circuit containing processing components, a group of distributed processing components, a group of distributed computers configured for processing, a field programmable gate array (FPGA), etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The ECU 202 may preferably also be arranged in communication with e.g. a radionavigation system, for example including a GPS receiver 220 as well as a map database 222 e.g. holding map navigation data relating to a road where the vehicle 100, 102, 104 is travelling.

Figures 3, 4:
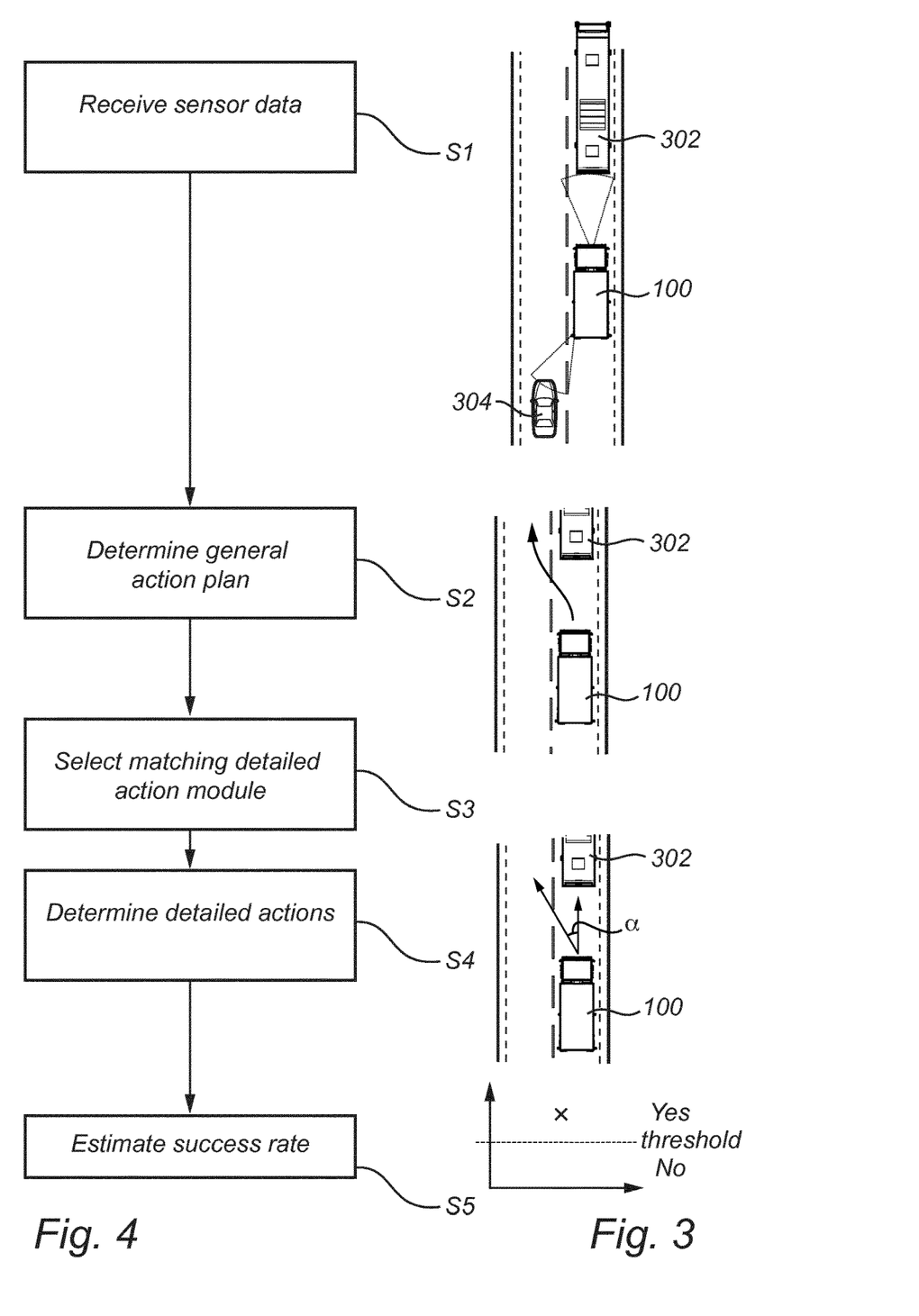
FIG. 3 exemplifies an operation of the control system.
FIG. 4 illustrates the processing steps for performing the method according to the present disclosure.

During operation of the control system 200 for controlling the operation of the vehicle 100, 102, 104, with further reference to FIGS. 3 and 4, the ECU 202 is adapted to implement at least a general action module 210 and a plurality of detailed action modules 212, 214, 216, 218. As discussed above, the general action module 302 is adapted to implement a macro portion of forming an overall action plan as how to operate the vehicle 100, 102, 104, such as within e.g. the next 20 seconds (or alternatively 200-500 meters ahead of the vehicle). As such, the general action module 210 is configured to form one or a plurality of general action plans relating to e.g. a lane change, creating gap for a lane change, forcing a gap for a lane change, facilitating surrounding traffic for a lane change, navigating an intersection, navigating a roundabout, navigating a road construction area, stopping at a side of a road, decreasing a time gap, increasing a time gap, initiating a longitudinal velocity change, initiating a lateral velocity change, and initiating an abort maneuver.

Correspondingly, the detailed action modules 212, 214, 216, 218 are then rather each provided for implementing a micro portion of the operating the vehicle, such as for determining detailed actions that needs to be taken for operating the vehicle within the next e.g. 10 seconds (or alternatively 0-200 meters ahead of the vehicle) and with the purpose of fulfilling the general action plan formed by the general action module 302. Examples of detailed actions may for example generally include what combination of trajectories the vehicle must operate according to for fulfilling the general action plan, and more specifically including acceleration requests, deceleration requests, adjustment of a steering angle, a magnitude of a longitudinal velocity change, a magnitude of a lateral velocity change, an operation of turn indicator lights, and an operation of a vehicle horn, etc.

In line with the example as is illustrated in FIG. 3, the process starts by the ECU 202 of the vehicle 100, 102, 104 receives, S1, sensor data from at least one of the plurality of sensors 204, 206, 208, and possibly also from further sensors comprised with the vehicle 100, 102, 104, such as information comprised with e.g. a CAN bus of the vehicle 100, 102, 104 (e.g. speed, acceleration, etc.) and relating to the operation of the vehicle 100, 102, 104. The ECU 202 may also receive information from the GPS receiver 220 and the map database 222, relating to where the vehicle is e.g. presently located. The map database 222 may in some embodiments hold a predetermined travel path relating to how the vehicle 100, 102, 104 is to generally drive from a start position to a destination.

Within the context of the present disclosure, a module may be seen as an independent, possibly interchangeable portion of the overall scheme, where each module each contains everything necessary to execute only one aspect of the desired functionality. Due to this structure, existing modules may be easily changed and/or further modules may be added.

The general action module 210 and based on the sensor data form an "understanding" of the surrounding of the vehicle 100, 102, 104, for example including where other vehicles such as exemplary vehicles 302 and 304 are located (in relation to the "own" vehicle), e.g. defined as a current traffic situation for the vehicle 100, 102, 104.

As shown in FIG. 3, the own vehicle, exemplified with vehicle 100, is located in a right-hand lane travelling forward on a twin lane road. Based on the sensor data it is determined that vehicle 302 is located ahead of the own vehicle 100, and that the vehicle 304 is located slightly behind and in the left-hand lane. It is further determined that the own vehicle 100 is travelling slightly faster than the forward vehicle 302.

Based on this information, the general action module 210 determines, S2, a general action plan indicative of a desire to change to the left-hand lane, and in front of the vehicle 304. Based on the determined general action plan, the ECU 202 selects one or a plurality of the detailed action modules 212, 214, 216, 218 that match at least a portion of the determined general action plan. That is and as discussed above, the plurality of the detailed action modules 212, 214, 216, 218 are preferably designed to handle different parts of the actions that needs to be performed for successfully performing the lane change.

In the present example it may for example be suitable to select e.g. one detailed action module that has been adapted to determine how much the vehicle must accelerate to allow it to be safe to perform the lane change, one detailed action module that has been adapted to determine a steering angle a for safely changing lane, one detailed action module that has been adapted to determine when a turn signal is suitable to be activated, etc. Further detailed action modules may of course be selected.

As is understood from the above, the selected detailed action modules are provided for together determine, S4, a plurality of detailed actions to be performed for fulfilling the desired general action plan. The different detailed action modules may in some embodiments be implemented to take into account operational parameters for the vehicles, such as maximum speed, maximum steering angles, weight, etc. The different detailed action modules may also be previously "trained" on vehicle operational data, e.g. by arranging the different detailed action modules to at least partly implement a machine learning scheme.

In some embodiments the plurality of detailed actions may include actual control parameters for operating the vehicle 100. However, the plurality of detailed actions may alternatively (or also) relate to simulation of different scenarios for operating the vehicle, i.e. not necessarily final control parameters but rather estimations of how to operate the vehicle.

Once the plurality of detailed actions has been determined, the present disclosure implements an estimation, S5, of a success rate based on the plurality of detailed actions. That is, e.g. an overall simulation may be performed for estimating of the combination of at least a portion of the plurality of detailed actions will allow the lane change to be performed in a safe manner. In some embodiments of the present disclosure, the success rate may be determined for "different scenarios". In line with the example presented in FIG. 3, different scenarios may for example relate to e.g. different levels of acceleration, etc.

Preferably, the success rate is benchmarked towards a threshold for determining if the combination of the plurality of detailed actions should be "executed" for controlling the vehicle to change the lane. In case the success rate is considered above the threshold the vehicle is controlled based on the plurality of detailed actions. As indicated above, the threshold may be allowed to be dependent on external factors, such as e.g. a current speed of an allowed speed for the road where the own vehicle 100 is currently travelling.

Conversely, in case the success rate is below the threshold, this result may be used by the ECU 202 for initiating a new determination of an "alternative" general action plan. Such a general action plan may in fact also relate to changing lane, but for example including that the own vehicle 100 should allow the vehicle 304 to pass before changing to the left-hand lane. Detailed actions in such a scenario may for example include deacceleration (to ensure that the own vehicle 100 doesn't collide with the forwards vehicle 302), and a further steering angle a for safely changing lane once the vehicle 304 has safely passed the own vehicle 100 (in the left-hand lane).

It should further be understood that in case more than a single scenario is evaluated, it may be allowed to sort the success rates for the different scenarios and then proceed with the scenario that is considered to have the highest success rate and still being above the threshold.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A computer implemented method for operating an autonomous vehicle, comprising:
   receiving, at an electronic control unit (ECU) from at least one sensor, sensor data comprising information in an area in a driving direction of and in a vicinity of the vehicle,
   determining, by the ECU using a general action module and based on the sensor data, a desired general action plan to be performed by the vehicle, the general action module directed to a macro portion of operating the vehicle within a macro window,
   selecting, by the ECU based on the desired general action plan, a plurality of detailed action modules, each of the plurality of detailed action modules directed to a micro portion of operating the vehicle within a micro window shorter than the macro window,
   determining, by the ECU based on the selected plurality of detailed action modules and the sensor data, a plurality of detailed actions directed to control parameters for operating the vehicle within the micro window and for fulfilling the desired general action plan,
   estimating by the ECU based on the plurality of determined detailed actions, a success rate for fulfilling the desired general action plan, and operating, by the ECU, the vehicle based on the plurality of determined detailed actions and the estimated success rate.

2. The method of claim 1, wherein the desired general action plan includes one or a combination of general action plans.

3. The method of claim 1, wherein the desired general action plan is selected from a group comprising a lane change, creating a gap for a lane change, forcing a gap for a lane change, facilitating surrounding traffic for a lane change, navigating an intersection, navigating a roundabout, navigating a road construction area, stopping at a side of a road, decreasing a time gap, increasing a time gap, initiating a longitudinal velocity change, initiating a lateral velocity change, and initiating an abort maneuver.

4. The method of claim 1, wherein the plurality of detailed actions are selected from a group comprising an acceleration request, a deceleration request, a steering angle request, an operation of turn indicator lights, and an operation of a vehicle horn.

5. The method of claim 1, wherein the desired general action plan is indicative of an action to be taken within the next 20 seconds.

6. The method of claim 1, wherein the plurality of detailed actions are indicative of actions to be taken within less than 10 seconds.

7. The method of claim 1, wherein the desired general action plan is related to a traffic planning maneuver for the vehicle.

8. The method of claim 1, wherein operating, by the ECU, the vehicle according to the plurality of determined detailed actions and the estimated success rate further comprises:
operating, by the ECU, the vehicle according to the plurality of determined detailed actions depending on the estimated success rate being above a threshold level, the threshold level dependent on a current speed of the vehicle.

9. The method of claim 1, wherein the plurality of detailed actions relates to operating the vehicle according to an estimated travel path.

10. An electronic control unit (ECU) adapted to control an autonomous vehicle, the ECU adapted to:
receive sensor data from at least one sensor, the sensor data comprising information in an area in a driving direction of and in a vicinity of the vehicle,
determine, using the general action module and based on the sensor data, a desired general action plan to be performed by the vehicle, the general action module directed to a macro portion of operating the vehicle within a macro window,
select, based on the desired general action plan, a plurality of detailed action modules, each of the plurality of detailed action modules directed to a micro portion of operating the vehicle within a micro window shorter than the macro window,
determine, based on the selected plurality of detailed action module and the sensor data, a plurality of detailed actions directed to control parameters for operating the vehicle within the micro window and for fulfilling the desired general action plan,
estimate, based on the plurality of determined detailed actions, a success rate for fulfilling the desired general action plan,
operate the vehicle based on the plurality of detailed actions and the estimated success rate.

11. The ECU of claim 10, wherein the desired general action plan includes one or a combination of general actions.

12. The ECU of claim 10, wherein the desired general action plan is indicative of an action to be taken within the next 20 seconds.

13. The ECU of claim 10, wherein the plurality of detailed actions are indicative of actions to be taken within less than 10 seconds.

14. The ECU of claim 10, wherein the plurality of detailed actions relates to operating the vehicle according to an estimated travel path.

15. The ECU claim 10, wherein the at least one sensor comprises a radar, a LiDAR sensor, or a camera.

16. The ECU of claim 10, wherein operating the vehicle according to the plurality of determined detailed actions and the estimated success rate further comprises:
operating the vehicle according to the plurality of determined detailed actions depending on the estimated success rate being above a threshold level, the threshold level dependent on a current speed of the vehicle.

17. A computer program product comprising a non-transitory computer readable medium having stored thereon computer program instructions to cause a processor device to:
receive, at an electronic control unit (ECU) from at least one sensor, sensor data comprising information in an area in a driving direction of and in a vicinity of an autonomous vehicle,
determine, by the ECU using a general action module and based on the sensor data, a desired general action plan to be performed by the vehicle, the general action module directed to a macro portion of operating the vehicle within a macro window,
select, by the ECU based on the desired general action plan, a plurality of detailed action modules, each of the plurality of detailed action modules directed to a micro portion of operating a vehicle within a micro window shorter than the macro window,
determine, by the ECU based on the selected plurality of detailed action modules and the sensor data, a plurality of detailed actions directed to control parameters for operating the vehicle within the micro window and for fulfilling the desired general action plan,
estimate, by the ECU based on the plurality of determined detailed actions, a success rate for fulfilling the desired general action plan, and
operate, by the ECU, the vehicle based on the plurality of determined detailed actions and the estimated success rate.

18. The computer program product of claim 17, wherein operating, by the ECU, the vehicle according to the plurality of determined detailed actions and the estimated success rate further comprises:
operating, by the ECU, the vehicle according to the plurality of determined detailed actions depending on the estimated success rate being above a threshold level, the threshold level dependent on a current speed of the vehicle.

* * * * *